United States Patent [19]
Lee et al.

[11] Patent Number: 5,757,377
[45] Date of Patent: May 26, 1998

[54] EXPEDITING BLENDING AND INTERPOLATION VIA MULTIPLICATION

[75] Inventors: Ruby Bei-Loh Lee, Los Altos Hills; Michael J. Mahon, San Jose, both of Calif.

[73] Assignee: Hewlett-Packard Company, Palo Alto, Calif.

[21] Appl. No.: 650,197

[22] Filed: May 20, 1996

Related U.S. Application Data

[60] Provisional application No. 60/000,270, Jun. 16, 19995.
[51] Int. Cl.$^6$ ............................................. G06G 7/30
[52] U.S. Cl. ............................................. 345/431
[58] Field of Search ........................... 395/131, 523; 345/431, 523; 364/723

[56] References Cited

U.S. PATENT DOCUMENTS

| | | | |
|---|---|---|---|
| 4,808,988 | 2/1989 | Burke et al. | 345/443 X |
| 5,157,388 | 10/1992 | Kohn | 364/723 |
| 5,396,441 | 3/1995 | Ozawa | 364/577 |

OTHER PUBLICATIONS

Blinn, Compositing, Part I: Theory, IEEE Computer Graphics & Applications, pp. 83–87, Sep. 1994.

*Primary Examiner*—Anton Fetting

[57] ABSTRACT

Circuitry combines a first operand $A_0$, a second operand $A_1$, and a third operand X in a blend function to produce a result Z. The result Z has a value equal to $X*A_0+(1-X)*A_1$. The circuitry includes a plurality of logic gates organized in rows. When performing the blend operation each logic gates selects either a bit of the first operand $A_0$ or a bit of the second operand $A_1$. The selection for each logic gate depends upon bits of the third operand X. More specifically, each of the plurality of rows of logic gates selects the first operand $A_0$ as output when an associated bit of the third operand X is at logic 1, and selects the second operand $A_1$ as output when the associated bit of the third operand X is at logic 0. In addition to output generated by the plurality of rows of logic gates, a correction term is generated. For the blend operation, the correction term generated is the second operand $A_1$. Partial product circuitry sums outputs of each row of logic gates and the correction term, to produce the result Z, so that the result Z has a value equal to $X*A_0+(1-X)*A_1$.

12 Claims, 6 Drawing Sheets

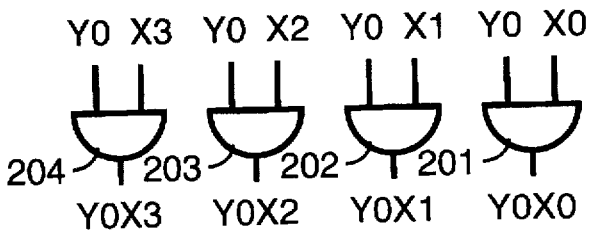
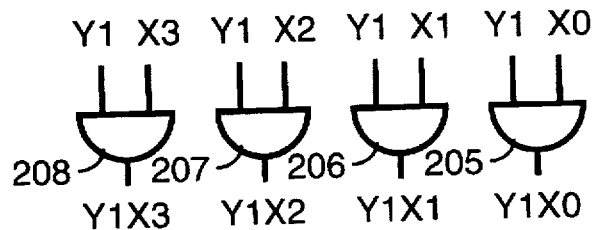
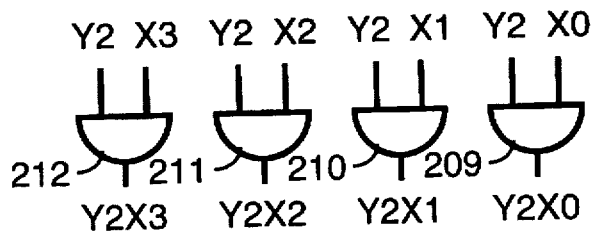
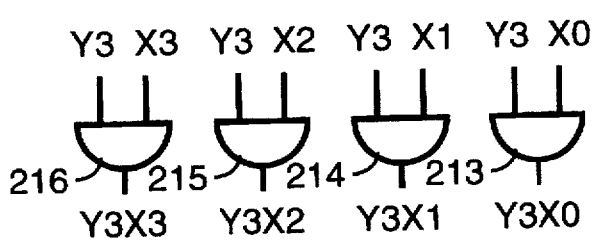
FIGURE 1 (PRIOR ART)
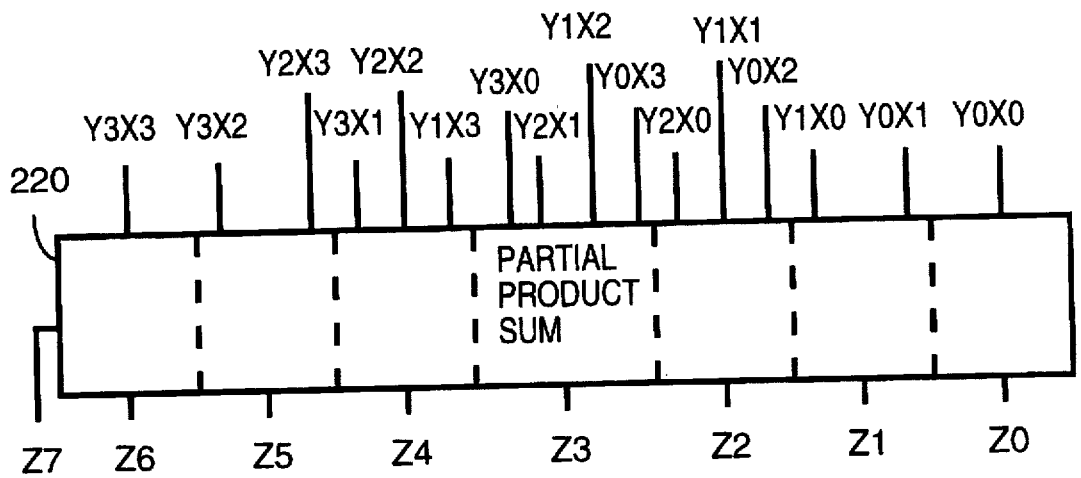

EXPEDITING BLENDING AND INTERPOLATION VIA MULTIPLICATION

CROSS REFERENCE TO RELATED APPLICATION

This application is based on provisional application Ser. No. 60/000,270, filed Jun. 16, 1995.

BACKGROUND

The present invention concerns computer operations implemented in hardware and particularly hardware which performs expedited blending and interpolation.

A common operation in graphics and imaging applications is the interpolation or blending function. This function is represented by the following equation:

$$\text{BLEND}(X,A_0,A_1) = X*A_0 + (1-X)*A_1$$

For this operation, X is a fractional value between 0 and 1. When this blend operation is used in graphics and imaging applications, sometimes X is constant for a long string of values for $A_0$ and $A_1$. Sometimes X changes with each new pair of values for $A_0$ and $A_1$.

In the prior art, no special hardware has been used to perform the blend command. Rather, the blend command has been implemented, where required, using two multiplication operations and two addition operations. Often this has been reduced to one multiplication and two additions if multiplications are more costly than additions and subtractions. Such a function is represented, for example, by the following equation:

$$\text{BLEND}(X,A_0,A_1) = X*(A_0 - A_1) + A_1$$

SUMMARY OF THE INVENTION

In accordance with the preferred embodiment of the present invention, circuitry combines a first operand $A_0$, a second operand $A_1$, and a third operand X in a blend function to produce a result Z. The result Z has a value equal to $X*A_0 + (1-X)*A_1$. The circuitry includes a plurality of logic gates organized in rows. When performing the blend operation each logic gate selects either a bit of the first operand $A_0$ or a bit of the second operand $A_1$. The selection for each logic gate depends upon bits of the third operand X.

More specifically, each of the plurality of rows of logic gates selects the first operand $A_0$ as output when an associated bit of the third operand X is at logic 1, and selects the second operand $A_1$ as output when the associated bit of the third operand X is at logic 0.

In addition to output generated by the plurality of rows of logic gates, a correction term is generated. For the blend operation, the correction term generated is the second operand $A_1$. Partial product circuitry sums outputs of each row of logic gates and the correction term, to produce the result Z, so that the result Z has a value equal to $X*A_0 + (1-X)*A_1$.

In one embodiment of the invention, the blend function is implemented in circuitry which also performs multiplication. When performing a multiplication, each logic gate in the plurality of rows of logic gates performs a logic AND function between a bit of the third operand X and a bit of the second operand $A_1$. When performing multiplication, logic 0 is generated as the correction term. The partial product sum circuitry sums output from each row of logic gates and the correction term to produce the result Z so that the result Z has a value equal to $X*A_1$.

The present invention allows for a circuit implementation of a blend (interpolation) function. The present invention is particularly useful because the blend function may be added to an existing multiplier with only slight modifications to the multiplier.

BRIEF DESCRIPTION OF THE DRAWINGS

FIG. 1 shows a simplified block diagram of a multiplier in accordance with the prior art.

DESCRIPTION OF THE PRIOR ART

FIG. 1 shows a four-bit multiplier in accordance with the prior art. The multiplier multiplies a four-bit first multiplicand $X_3X_2X_1X_0$ (base 2) with a four-bit second multiplicand $Y_3Y_2Y_1Y_0$ (base 2) to produce an eight-bit result $Z_7Z_6Z_5Z_4Z_3Z_2Z_1Z_0$ (base 2). As is understood by those skilled in the art, logic AND gates 201, 202, 203, 204, 205, 206, 207, 208, 209, 210, 211, 212, 213, 214, 215 and 216 may be used to generate partial products for the multiplication. A partial product sum circuit 220 sums the partial products generated by logic AND gates 201 through 216 to produce the result.

The two multiplicands, $X_3X_2X_1X_0$ and $Y_3Y_2Y_1Y_0$, the partial products generated by logic AND gates 201 through 216, and the result produced by partial product sum circuit 220 may be placed in a table in such a way as to summarize operation of the multiplier. For example, such a table is shown as Table 1 below:

TABLE 1

|    |    |    |    | $X_3$ | $X_2$ | $X_1$ | $X_0$ |    |
|----|----|----|----|----|----|----|----|----|
|    |    |    |    | $Y_0X_3$ | $Y_0X_2$ | $Y_0X_1$ | $Y_0X_0$ | $y_0$ |
|    |    |    | $Y_1X_3$ | $Y_1X_2$ | $Y_1X_1$ | $Y_1X_0$ |    | $Y_1$ |
|    |    | $Y_2X_3$ | $Y_2X_2$ | $Y_2X_1$ | $Y_2X_0$ |    |    | $Y_2$ |
|    | $Y_3X_3$ | $Y_3X_2$ | $Y_3X_1$ | $Y_3X_0$ |    |    |    | $Y_3$ |
| Z7 | Z6 | Z5 | Z4 | Z3 | Z2 | Z1 | Z0 |    |

In the notation used in Table 1 above, the bit position of each bit of both multiplicands and the result is specifically identified. Additionally, the bits of the multiplicand which are used to form each partial product are specifically set out.

DESCRIPTION OF THE PREFERRED EMBODIMENT

Figure 2:
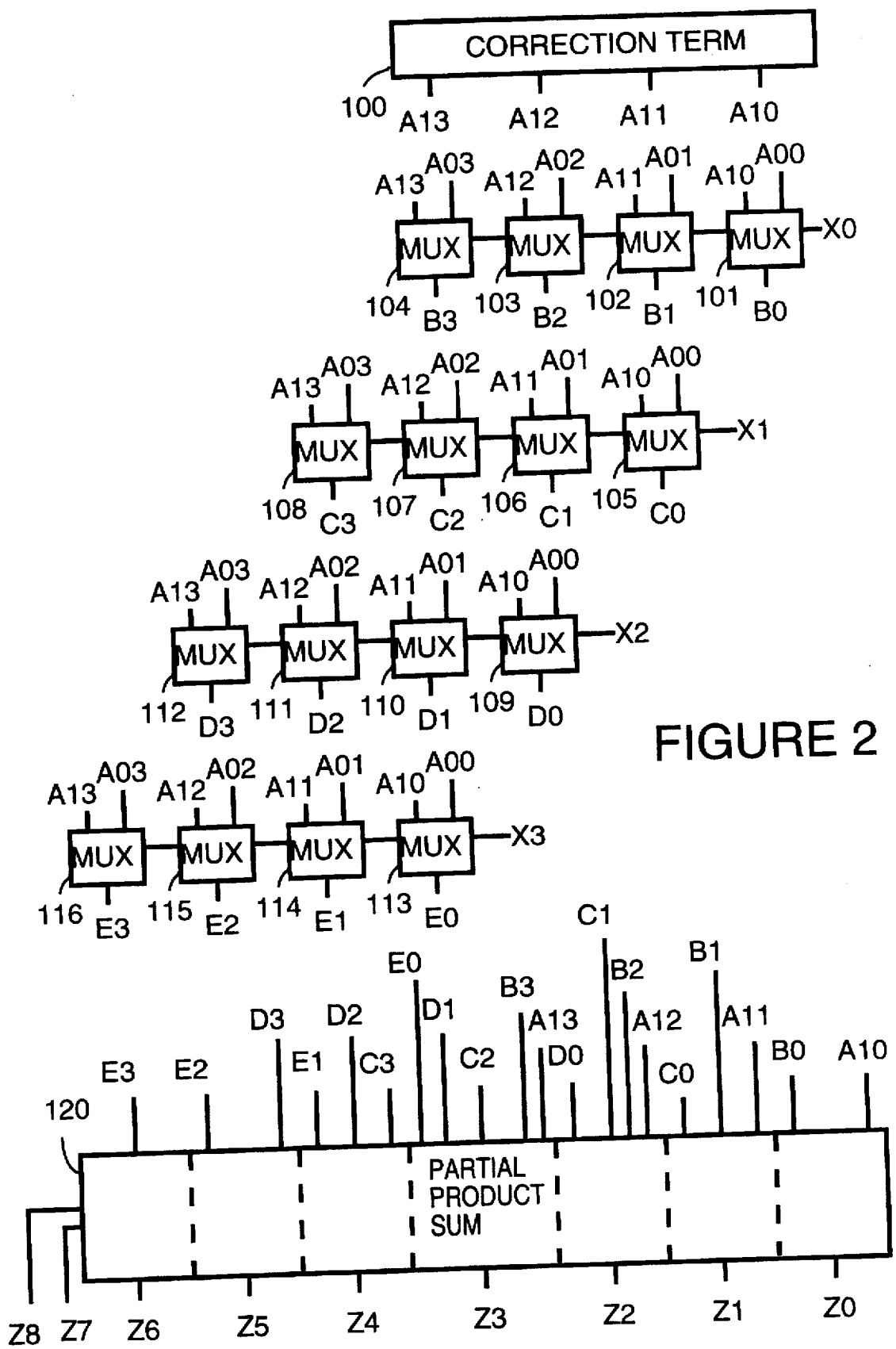
FIG. 2 shows a simplified block diagram of circuitry which performs a blend operation in accordance with a preferred embodiment of the present invention.

FIG. 2 shows a simplified block diagram of circuitry used to implement a blend (interpolation) operation in accordance with a preferred embodiment of the present invention. Specifically, the hardware implements the blend function set out by Equation 1 below:

$$\text{BLEND}(X,A_0,A_1) = Z = X*A_0 + (1-X)*A_1 \qquad \text{Equation 1}$$

For the hardware implementation shown in FIG. 1, $A_0$ is a four bit positive integer which is represented as follows: $A_{03}A_{02}A_{01}A_{00}$ (base 2). $A_1$ is a four bit positive integer which is represented as follows: $A_{13}A_{12}A_{11}A_{10}$ (base 2). X is a four bit fractional value between 0 and 1 which is represented as follows: $0.X_3X_2X_1X_0$ (base 2). The blend operation produces a nine-bit result Z which is represented as follows: $Z_8Z_7Z_6Z_5Z_4.Z_3Z_2Z_1Z_0$ (base 2).

For the blend operation, multiplexors 101, 102, 103, 104, 105, 106, 107, 108, 109, 110, 111, 112, 113, 114, 115 and 116 each select a bit from either operand $A_0$ or operand $A_1$, as shown. One bit of operand X determines for each row of multiplexors which operand is to be selected. For the row of multiplexors 104, 103, 102 and 101, when $X_0$ is a logic 0, multiplexors 104, 103, 102 and 101 select operand bits $A_{13}$, $A_{12}$, $A_{11}$ and $A_{10}$, as output $B_3$, $B_2$, $B_1$ and $B_0$, respectively. When $X_0$ is a logic 1, multiplexors 104, 103, 102 and 101 select operand bits $A_{03}$, $A_{02}$, $A_{01}$ and $A_{00}$, as output $B_3$, $B_2$, $B_1$ and $B_0$, respectively.

For the row of multiplexors 108, 107, 106 and 105, when $X_1$ is a logic 0, multiplexors 108, 107, 106 and 105 select operand bits $A_{13}$, $A_{12}$, $A_{11}$ and $A_{10}$, as output $C_3$, $C_2$, $C_1$ and $C_0$, respectively. When $X_1$ is a logic 1, multiplexors 108, 107, 106 and 105 select operand bits $A_{03}$, $A_{02}$, $A_{01}$ and $A_{00}$, as output $C_3$, $C_2$, $C_1$ and $C_0$, respectively.

For the row of multiplexors 112, 111, 110 and 109, when $X_2$ is a logic 0, multiplexors 112, 111, 110 and 109 select operand bits $A_{13}$, $A_{12}$, $A_{11}$ and $A_{10}$, as output $D_3$, $D_2$, $D_1$ and $D_0$, respectively. When $X_2$ is a logic 1, multiplexors 112, 111, 110 and 109 select operand bits $A_{03}$, $A_{02}$, $A_{01}$ and $A_{00}$, as output $D_3$, $D_2$, $D_1$ and $D_0$, respectively.

For the row of multiplexors 116, 115, 114 and 113, when $X_3$ is a logic 0, multiplexors 116, 115, 114 and 113 select operand bits $A_{13}$, $A_{12}$, $A_{11}$ and $A_{10}$, as output $E_3$, $E_2$, $E_1$ and $E_0$, respectively. When $X_3$ is a logic 1, multiplexors 116, 115, 114 and 113 select operand bits $A_{03}$, $A_{02}$, $A_{01}$ and $A_{00}$, as output $E_3$, $E_2$, $E_1$ and $E_0$, respectively.

A correction term generator 100 generates a correction term consisting of operand bits $A_{13}$, $A_{12}$, $A_{11}$ and $A_{10}$. A partial product sum circuit 120 sums outputs generated by multiplexors gates 101 through 116 and correction term generator 100, as shown.

Partial product sum circuit 120 is implemented similarly to partial product sum circuit 120, shown in FIG. 1, except however, that partial product sum circuit 120, allows for an extra summing term, in this case, the correction term generated by correction term generator 100.

Below follows an explanation of why the circuit shown in FIG. 2 accomplishes a blend operation. When X is a four bit fractional value between 0 and 1, the following Equation 2 may be used to calculate the value 1–X:

$(1-X)=\sim X+0.0001(\text{base } 2)$   Equation 2

In Equation 2 above, ~X is the one's complement of X. That is, if X has the value of 0.0000(base 2), then ~X has the value of 0.1111(base 2). If X has the value of 0.0100(base 2), then ~X has the value of 0.1011(base 2). And so on. Equation 3 below is obtained by substituting Equation 2 into Equation 1, for the case when X is a four bit fractional value between 0 and 1:

$\text{BLEND }(X,A_0,A_1)=Z=X*A_0+\sim X*A_1+0.0001(\text{base } 2)*A_1$   Equation 3

Looking again at FIG. 2, it can be seen how the circuitry generates a blend operation. The correction term generator 100 produces the value $0.0001(\text{base } 2)*A_1$. For each bit of X, when the bit is equal to 0, that bit is multiplied by $A_1$. When the bit is equal to 1, that bit is multiplied by $A_1$.

More specifically, for the row of multiplexors 104, 103, 102 and 101, when $X_0$ is a logic 0, multiplexors 104, 103, 102 and 101 select the operand $A_1$ as output. When $X_0$ is a logic 1, multiplexors 104, 103, 102 and 101 select the operand A0 as output. For the row of multiplexors 108, 107, 106 and 105, when $X_1$ is a logic 0, multiplexors 108, 107, 106 and 105 select the operand A1 as output. When $X_1$ is a logic 1, multiplexors 108, 107, 106 and 105 select the operand A0 as output. For the row of multiplexors 112, 111, 110 and 109, when $X_2$ is a logic 0, multiplexors 112, 111, 110 and 109 select the operand A1 as output. When $X_2$ is a logic 1, multiplexors 112, 111, 110 and 109 select the operand A0 as output. For the row of multiplexors 116, 115, 114 and 113, when $X_3$ is a logic 0, multiplexors 116, 115, 114 and 113 select the operand A1 as output. When $X_3$ is a logic 1, multiplexors 116, 115, 114 and 113 select the operand A0 as output.

Figure 3:
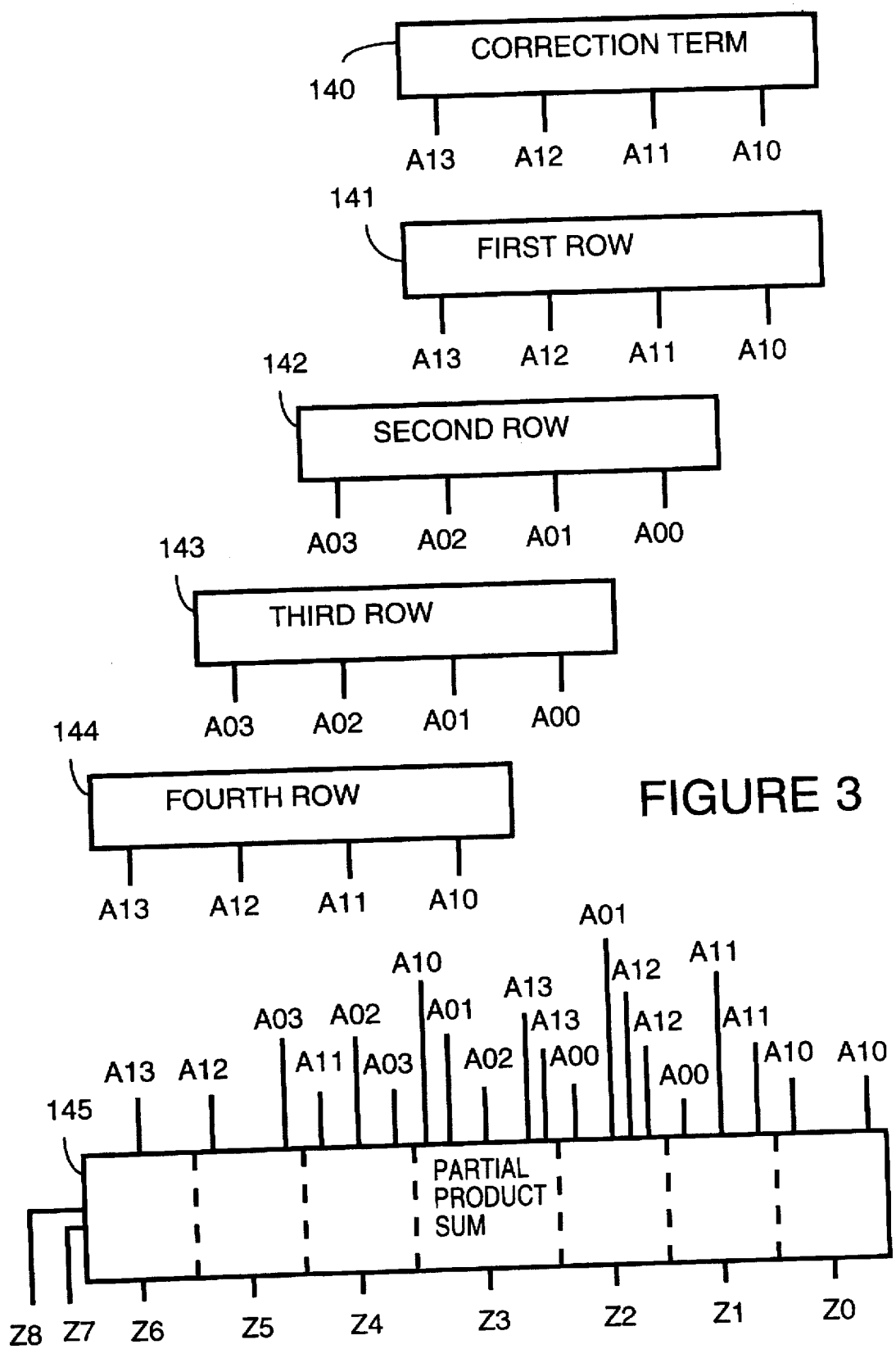
FIG. 3 shows results from the circuitry shown in FIG. 2, for a particular blend operation, in accordance with the preferred embodiment of the present invention.

For example, suppose X equals the value 0.0110, A0 equals the value 1010 and A1 equals the value 1111. FIG. 3 illustrates this example.

In FIG. 3, a correction term generator 140 generates the correction term $A_1$ (1111). Because the least significant bit $X_0$ of X is equal to 0, a first row of multiplexors 141 selects the value $A_1$ (1111) as output. Because the bit $X_1$ of X is equal to 1, a second row of multiplexors 142 selects the value $A_0$ (1010) as output. Because the bit $X_2$ of X is equal to 1, a third row of multiplexors 143 selects the value $A_0$ (1010) as output. Because the most significant bit $X_3$ of X is equal to 0, a fourth row of multiplexors 144 selects the value $A_1$ (1111) as output. A partial product sum circuit 145 sums outputs generated by the rows of multiplexors 141 through 143 and correction term generator 140, as shown.

While for simplicity of explanation, the above-description was made for four bit operands, as is clear, it is contemplated the present invention will be used for systems with more than four bits. For example, for the case when X is a sixteen bit fractional value between 0 and 1, the blend function may be performed as defined in Equation 4 below:

$\text{BLEND}(X,A_0,A_1)=Z=X*A_0+\sim X*A_1+0.00000000000000001(\text{base } 2)*A_1$   Equation 4

Circuitry similar to FIG. 2 with circuitry added for the number of bits of X, $A_0$ and $A_1$ can be used to generate a blend operation. The correction term generator 100 produces the value $0.00000000000000001(\text{base } 2)*A_1$. For each bit of X, when the bit is equal to 0, $A_1$ is selected. When the bit is equal to 1, for that bit $A_0$ is selected. A partial product sum circuit sums outputs generated by rows of multiplexors.

A blend instruction, BLEND ($X,A_0,A_1$), may be defined which includes registers as parameters. For example, Table 2 below defines a blend operation where registers are the passed parameters.

TABLE 2

| | |
|---|---|
| BLEND | r1, r2, rt |
| where | r1 contains $A_0$ || $A_1$ (i.e., 16 bits of $A_0$ followed by 16 bits of $A_1$), |
| | r2 contains 0 || X (i.e., 16 bits of zeros followed by 16 bits of X), |
| and | |
| | rt contains 32 bits of the result of the operation. |
| | BLEND $(X,A_0,A_1) = X * A_0 + (1 - X) * A_1$ for $0 <= X < 1$ |

As indicated above, the present invention can be integrated into a multiplier. This is illustrated by FIG. 4 and FIG. 5.

Figure 4:
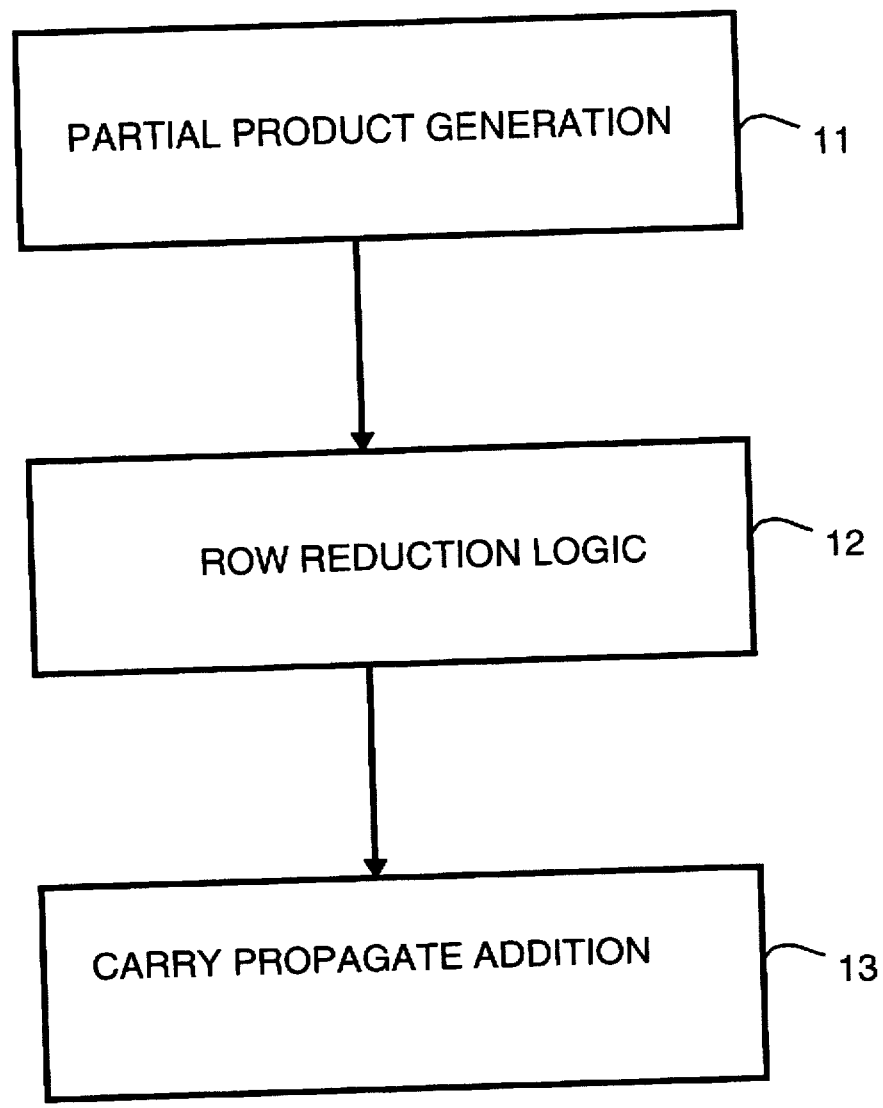
FIG. 4, FIG. 5 and FIG. 6 show a simplified embodiment of a multiplier modified to perform a blend operation in accordance with a preferred embodiment of the present invention.

FIG. 4 shows a block diagram of an integer or mantissa multiplier. Partial product generation logic 11 generates rows of partial products. Row reduction logic 12 uses counters to reduce the rows of partial products to two rows. For example, a three-to-two counter is implemented using a one-bit adder slice which adds three one-bit inputs to produce a two-bit output. Carry propagate addition logic 13 performs a full carry-propagate add on the two remaining rows to produce a final product. Row reduction logic 12 and carry propagate addition logic 13 together carry out the functionality of a partial product sum circuit, such as partial product sum circuit 145.

Generally, most of the circuitry and execution latency of a multiplier exists in row reduction logic 12 and carry propagate addition logic 13. In the preferred embodiment, only a slight change is made to row reduction logic 12 and carry propagate additional logic 13 of a multiplier in order to perform a blend operation. Particularly, these are modified, as discussed above, to account for the addition of one more row. In partial product generation logic 11, the two input logic AND gates normally in a multiplier are replaced with logic which allows for selection of partial product bits.

Figure 5:
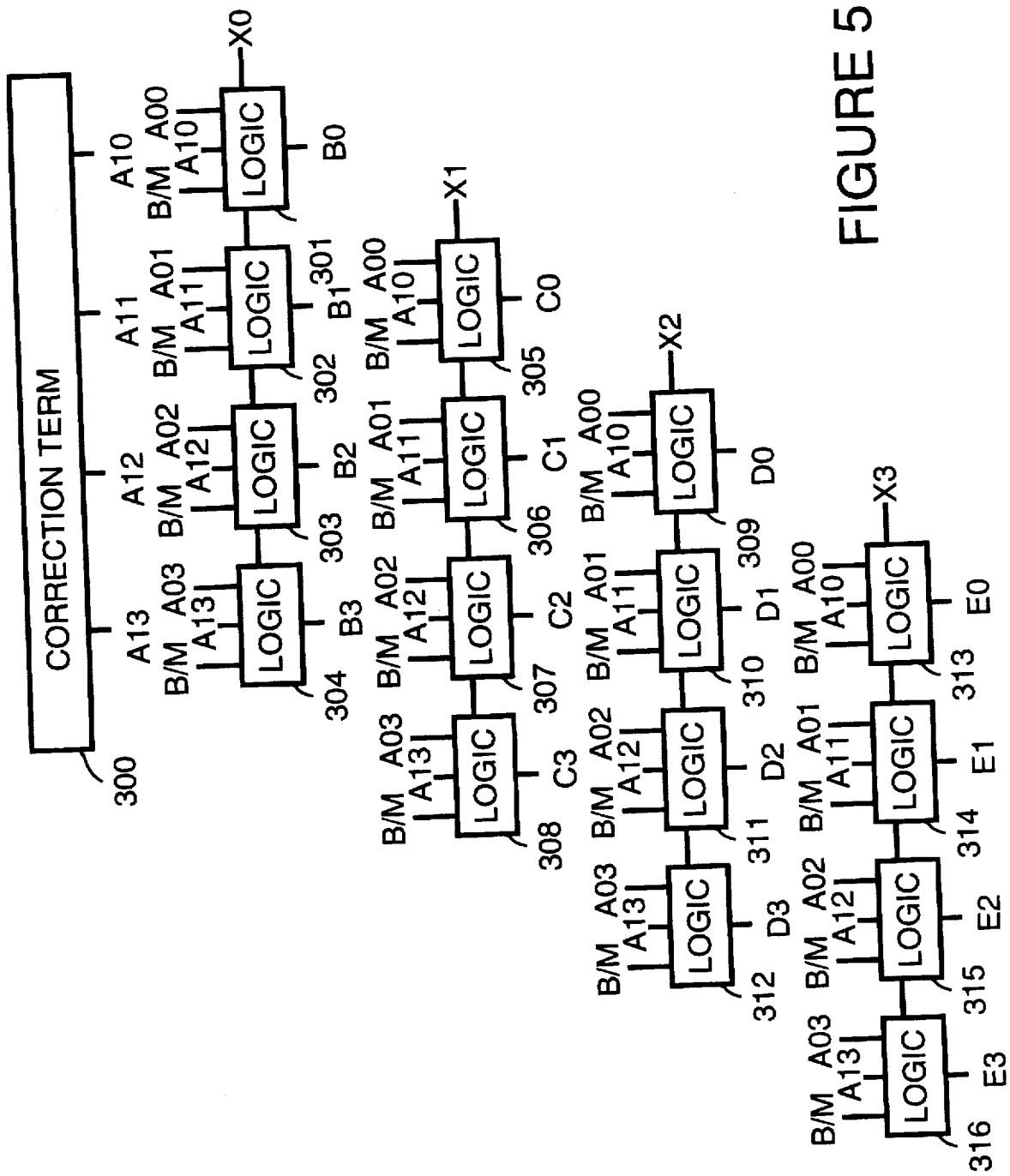

FIG. 5 shows a partial product generation logic for a four-bit multiplier in accordance with a preferred embodiment of the present invention. When the blend/multiply (B/M) signal is equal to logic 0, the multiplier multiplies a four-bit first multiplicand $A_{13}A_{12}A_{11}A_{10}$ (base 2) with a four-bit second multiplicand $X_3X_2X_1X_0$ (base 2) to produce an eight-bit result. Logic gates 301, 302, 303, 304, 305, 306, 307, 308, 309, 310, 311, 312, 313, 314, 315 and 316 are used to generate partial products for the multiplication. The partial products generated by logic gates 301 through 316 are summed to produce the result.

When the blend/multiply (B/M) signal is equal to logic 1, a blend operation is performed. For the blend operation, logic gates 301, 302, 303, 304, 305, 306, 307, 308, 309, 310, 311, 312, 313, 314, 315 and 316 are used to select a bit from either operand $A_0$ or operand $A_1$, as shown. One bit of operand X determines for each row of logic gates which operand is to be selected. For the row of logic gates 304, 303, 302 and 301, when $X_0$ is a logic 0, logic gates 304, 303, 302 and 301 select operand bits $A_{13}$, $A_{12}$, $A_{11}$ and $A_{10}$, as output $B_3$, $B_2$, $B_1$ and $B_0$, respectively. When $X_0$ is a logic 1, logic gates 304, 303, 302 and 301 select operand bits $A_{03}$, $A_{02}$, $A_{01}$ and $A_{00}$, as output $B_3$, $B_2$, $B_1$ and $B_0$, respectively.

For the row of logic gates 308, 307, 306 and 305, when $X_1$ is a logic 0, logic gates 308, 307, 306 and 305 select operand bits $A_{13}$, $A_{12}$, $A_{11}$ and $A_{10}$, as output $C_3$, $C_2$, $C_1$ and $C_0$, respectively. When $X_1$ is a logic 1, logic gates 308, 307, 306 and 305 select operand bits $A_{03}$, $A_{02}$, $A_{01}$ and $A00$, as output $C_3$, $C_2$, $C_1$ and $C_0$, respectively.

For the row of logic gates 312, 311, 310 and 309, when $X_2$ is a logic 0, logic gates 312, 311, 310 and 309 select operand bits $A_{13}$, $A_{12}$, $A_{11}$ and $A_{10}$, as output $D_3$, $D_2$, $D_1$ and $D_0$, respectively. When $X_2$ is a logic 1, logic gates 312, 311, 310 and 309 select operand bits $A_{03}$, $A_{02}$, $A_{01}$ and $A_{00}$, as output $D_3$, $D_2$, $D_1$ and $D_0$, respectively.

For the row of logic gates 316, 315, 314 and 313, when $X_3$ is a logic 0, logic gates 316, 315, 314 and 313 select operand bits $A_{13}$, $A_{12}$, $A_{11}$ and $A_{10}$, as output $E_3$, $E_2$, $E_1$ and $E_0$, respectively. When $X_3$ is a logic 1, logic gates 316, 315, 314 and 313 select operand bits $A_{03}$, $A_{02}$, $A_{01}$ and $A_{00}$, as output $E_3$, $E_2$, $E_1$ and $E_0$, respectively.

Multiplexor 300 selects a correction term consisting of operand bits $A_{13}$, $A_{12}$, $A_{11}$ and $A_{10}$. Outputs generated by logic gates 301 through 316 and correction term generator 300 are summed to produce the answer for the blend operation.

Figure 6:
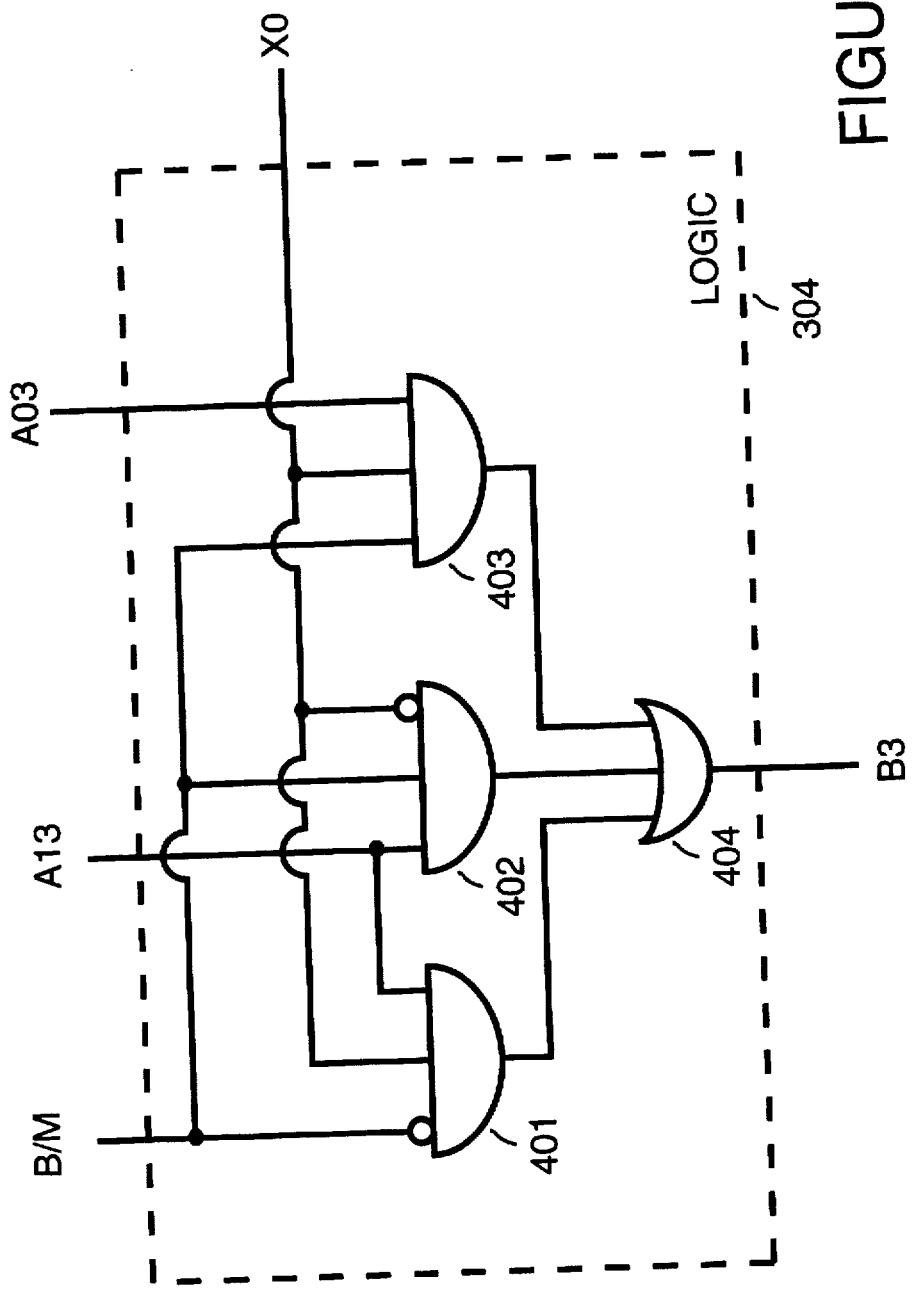

FIG. 6 shows how logic 304 may be implemented using a logic AND gate 401, a logic AND gate 402, a logic AND gate 403 and a logic OR gate 404.

The present invention may be combined with various types of multipliers. For example, in addition to direct multipliers, the present invention may be used with a Booth-encoded multiplier.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. Circuitry for use in a computing system comprising:
a row of logic gates for each bit of a first operand X, one row of logic gates selecting a second operand $A_0$ as output when an associated bit of the first operand X is at logic 1, and one row of logic gates selecting a third operand $A_1$ as output when the associated bit of the first operand X is at logic 0;
a correction term generator which outputs the third operand $A_1$; and,
partial sum product circuitry, coupled to the row of logic gates and the correction term generator, which sums outputs of each row of logic gates and output of the correction term generator to produce a result Z so that the result Z has a value equal to $X*A_0+(1-X)*A_1$.

2. Circuitry as in claim 1 wherein each row of logic gates for each bit of first operand X performs as a multiplexor which selects one of the second operand $A_0$ and the third operand $A_1$ based on the associated bit of the first operand X.

3. Circuitry as in claim 1 wherein the second operand $A_0$ and the third operand $A_1$ are stored in a first register and the first operand X is stored in a second register.

4. Circuitry for use in a computing system comprising:
a plurality of rows of logic gates, for each bit of a first operand X,
wherein when the circuitry is in a blend mode, the one row of logic gates selects a second operand $A_0$ as output when an associated bit of the first operand X is at logic 1, and one row of logic gates select a third operand $A_1$ as output when the associated bit of the first operand X is at logic 0, and
wherein when the circuitry is in a multiply mode, each logic gate performs a logic AND function between a bit of first operand X and a bit of third operand $A_1$;
a correction term generator which outputs the third operand $A_1$ when the circuitry is in the blend mode and outputs 0 when the circuitry is in the multiply mode; and,
partial sum product circuitry, coupled to the row of logic gates and the correction term generator, which sums outputs of each row of logic gates and output of the correction term generator to produce a result Z so that when the circuitry is in the blend mode, the result Z has a value equal to $X*A_0+(1-X)*A_1$, and when the circuitry is in the multiply mode, the result Z has a value equal to $X*A_1$.

5. Circuitry as in claim 4 wherein when blend is selected, each row of logic gates for each bit of first operand X performs as a multiplexor which selects one of the second operand $A_0$ and the third operand $A_1$ based on the associated bit of the first operand X.

6. Circuitry as in claim 4 wherein the second operand $A_0$ and the third operand $A_1$ are stored in a first register and the first operand X is stored in a second register.

7. A method for using circuitry to combine a first operand $A_0$ and a second operand $A_1$ to produce a result Z, the method comprising the following step:

(a) performing a blend operation utilizing the following substeps,
  - (a.1) selecting, by each logic gate in a plurality of rows of logic gates, one of a bit of the first operand $A_0$ and a bit of the second operand $A_1$, the selection for each logic gate depending upon bits of a third operand X.
  - (a.2) generating the second operand $A_1$ as a correction term, and
  - (a.3) summing outputs of each row of logic gates and the correction term, by partial product sum circuitry, to produce the result Z so that the result Z has a value equal to $X*A_0+(1-X)*A_1$.

8. A method as in claim 7 additionally comprising the following step:
  - (b) performing a multiplication operation utilizing the following substeps,
    - (b.1) performing, by each logic gate in the plurality of rows of logic gates, a logic AND function between a bit of the third operand X and a bit of the second operand $A_1$.
    - (b.2) generating logic 0 as the correction term, and
    - (b.3) summing outputs of each row of logic gates and the correction term, by the partial product sum circuitry, to produce the result Z so that the result Z has a value equal to $X*A_1$.

9. A method as in claim 8 wherein in substep (a.1) includes selecting, by each of the plurality of rows of logic gates, the first operand $A_0$ as output when an associated bit of the third operand X is at logic 1, and selecting, by each row of logic gates, the second operand $A_1$ as output when the associated bit of the third operand X is at logic 0.

10. A method as in claim 8 additionally comprising the following steps performed before step (a):

storing the first operand $A_0$ and the second operand $A_1$ in a first register; and, storing the third operand X in a second register.

11. A method as in claim 7 wherein in substep (a.1) includes selecting, by each of the plurality of rows of logic gates, the first operand $A_0$ as output when an associated bit of the third operand X is at logic 1, and selecting, by each row of logic gates, the second operand $A_1$ as output when the associated bit of the third operand X is at logic 0.

12. A method as in claim 7 additionally comprising the following steps performed before step (a):

storing the first operand $A_0$ and the second operand $A_1$ in a first register; and, storing the third operand X in a second register.

* * * * *